Oct. 26, 1926.
W. F. PLEMER
1,604,305
INTERLOCKING WEDGE BLOCK FOR MITER AND SQUARE JOINTS
Filed Sept. 24, 1924
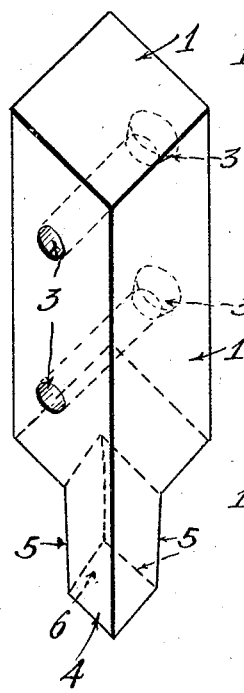
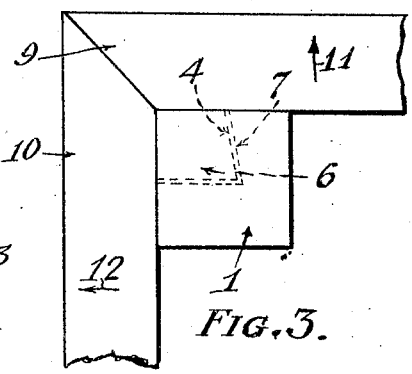
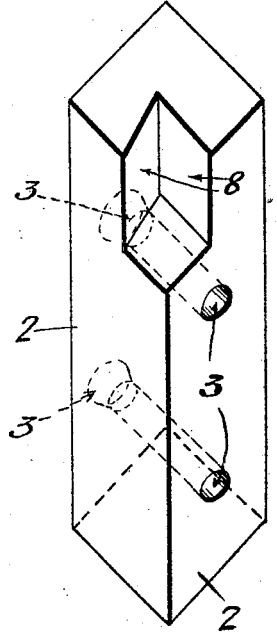
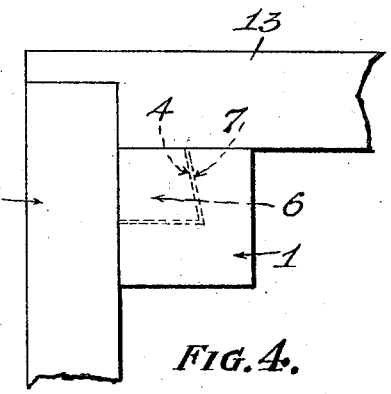
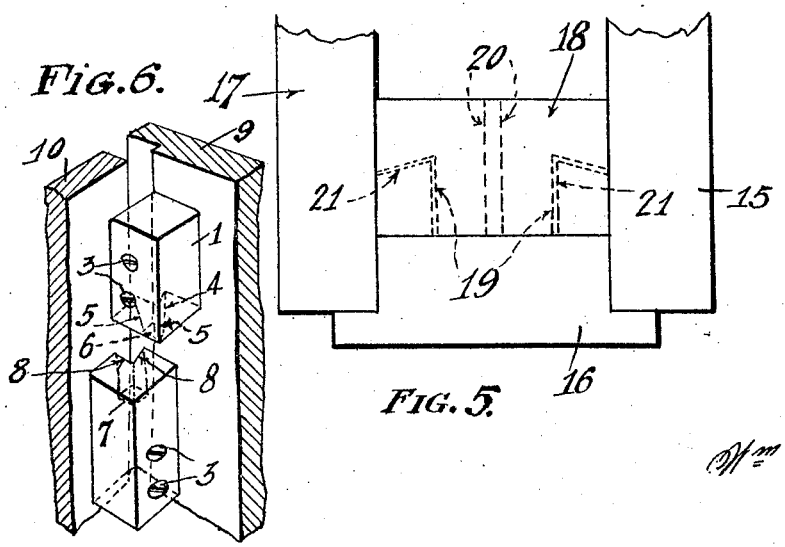
INVENTOR.
Wm H. Plemer.

Patented Oct. 26, 1926.

1,604,305

UNITED STATES PATENT OFFICE.

WILLIAM F. PLEMER, OF NEW ORLEANS, LOUISIANA.

INTERLOCKING WEDGE BLOCK FOR MITER AND SQUARE JOINTS.

Application filed September 24, 1924. Serial No. 739,663.

The invention generally relates to joining devices and primarily has for its object to provide a simple and effective means for joining pieces of woodwork or furniture parts without the use of screws, nails or glue in the actual function of joining such parts.

In its more detailed nature the invention seeks to provide simple male and female blocks provided with suitably positioned tenons and mortises whereby when the blocks are secured in any approved manner to pieces of woodwork or furniture that are to be assembled the said pieces may be assembled by merely bringing into cooperative relation the said mortises and tenons, without the use of nails, screws or glue.

With the above and other objects in view that will hereinafter appear, the invention further resides in the novel details of construction, combination and arrangement of parts, all of which will be first fully described, then be particularly pointed out in the appended claims, reference being had to the accompanying drawing, in which:—

Figure 1 is a detail perspective view of a simple type of male joining member.

Figure 2 is a detail perspective view of a simple type of female joining member.

Figure 3 is a somewhat diagrammatic plan view illustrating use of the invention in making a simple miter joint.

Figure 4 is a somewhat diagrammatic plan view illustrating use of the invention in making a lapped square joint.

Figure 5 is a somewhat diagrammatic plan view illustrating use of the invention in pilaster assembly.

Figure 6 is a detail perspective view illustrating two pieces equipped with my invention about to be assembled.

In carrying out my invention, I provide male and female members 1 and 2 which are in the nature of longitudinal blocks square in cross section when the invention is used in the forming of right angled joints. It is to be understood, however, that the invention may be used with joints which do not form a perfect right angle, in which case the converging sides of the interlocking male and female members 1 and 2 would bear the same relation as the faces of the pieces to be assembled in forming the joint would bear to one another.

Each of the members 1 and 2 may be provided with suitable countersunk screw holes 3 through which screws may be inserted to effect a securing of the blocks to the respective pieces with which they are to cooperate in forming the desired joint.

The male member 1 is provided with a tenon 4 projected from one corner of one end thereof in the manner illustrated in Figure 1 of the drawing, from which it will be observed that the inside or engaging faces of the said tenon are wedge shaped, as at 5, to provide a wedge clamping action for drawing the parts tightly together when the pieces are assembled. It will also be observed, by references to the drawing, that the tenon is so shaped that the inside or engaging faces converge in such manner as to provide an acute angle 6 or, in other words, the tenon is in the nature of a half-dovetail.

The female member 2 has one corner of one end thereof cut out to provide a corner mortise 7 of a shape for receiving the tenon of the male member and which has the inner faces thereof, adapted to engage the inside faces of the tenon, wedge cut or inclined, as at 8, to cooperate in providing the wedge action for drawing the parts together, as explained before in describing the tenon.

In Figures 3 and 4 of the drawing I have diagrammatically illustrated the invention as applied to use in forming a right angled miter joint and a right angled lapped square joint.

In the miter joint illustrated in Figure 3, the boards forming the joint and which are to be secured in their assembled right angular relation by the male and female joint members are designated 9 and 10. In the use of the invention the male member 1 would be secured to the board 9 and the female member to the board 10, both such members being secured to the respective boards so that when the same are assembled to form the right angled relation they are to bear, the said male and female members will be in the corner provided by that right angled relation and in longitudinal alignment so that when the boards 9 and 10 are moved longitudinally the tenon of the male member will move into the mortise of the female member and the engaging wedge shaped surfaces will tightly engage and draw the parts into tight engagement providing a perfect joint without the necessity of using screws, nails or any other securing means. In this manner any tendency to separate the members directed as indicated by the arrow 11 on Figure 3 of the drawing would be overcome by the back cut provided in forming the half-dovetail feature of the tenon and mortise, while any such strain directed as indicated by the arrow 12 on the said figure would, of course, be overcome by the portion of the block forming the female member which is left laterally of the mortise in the direction in which the screws are inserted through the said female member.

In Figure 4 of the drawing the boards forming the lapped square joint are indicated 13 and 14 and when the joint is thus formed the male and female members are secured to the individual pieces and act to hold them together in the same manner as is described above with relation to the miter joint.

In Figure 5 of the drawing I have illustrated the invention in use in connection with pilaster construction, and in this figure the three boards shown assembled by use of the male and female interlocking members are indicated 15, 16 and 17. In order to adapt the invention to use in such constructions I provide a double female block 18 which is secured to the board 16 in the position illustrated, the said block having two mortises 19 formed in the corner of one end thereof which lie against the said board 16. To cooperate with the double female block in securing the three boards to the assembled position, each of the boards 15 and 17 has secured thereto a male member 20, each of which is provided with a tenon 21 for fitting one of the mortises 19 of the female block 18. As the mortises 19 and tenons 21 of the male and female blocks used in this adaptation of the invention are constructed and operate exactly the same as those hereinbefore described further detailed description of the advantages and manner of assembling the parts of this last adaptation of the invention is deemed unnecessary.

By using the invention described in the foregoing description all necessity of securing the component parts of such structures as the invention is adapted to use upon, with nails, screws, glue or the like, is done away with. The actual assembly of the component parts of such structures is accomplished by interlocking and wedging action of the mortise and tenon connections of the male and female interlocking elements and in this manner joints are provided which may be quickly assembled and quickly disassembled.

From the foregoing description, taken in connection with the accompanying drawing, it is thought that the novel details of construction, manner of use and the advantages of my invention will be readily apparent to those skilled in the art to which it relates.

What I claim is:

1. The combination with two boards adapted to be edgewise assembled in angled relation thereby forming a corner, a male member secured to one board in the corner, a female member secured to the other board in the corner whereby said male and female members lie in longitudinal alignment with their adjacent ends opposed, said opposed ends of said members having mortise and tenon equipment adapted to be moved longitudinally into cooperation to secure the boards together.

2. In combination with pieces to be assembled in angled relation forming a corner therebetween, interlocking male and female blocks secured one to each piece to lie in the corner, said male block having a wedge tenon located directly in the corner, and said female block having a wedge mortise open toward the corner whereby the adjacent surfaces of the pieces will assist the open mortise of the female member in forming a complete mortise for the tenon of the male member, whereby when the pieces are moved longitudinally to interlock the blocks the said pieces will be secured together in wedge-tight relation.

3. The combination with two boards adapted to be edgewise assembled in angled relation thereby forming a corner, a male member secured to one board in the corner, a female member secured to the other board in the corner, said male and female members having opposing ends provided with a tapered mortise and tenon joint whereby to draw the male and female members against the boards to which they are not secured and at the same time draw the boards tightly together.

4. The combination with two boards adapted to be edgewise assembled in angled relation thereby forming a corner, a male member secured to one board in the corner, a female member secured to the other board in the corner, said male member having a projected tenon provided with two faces on planes with the faces of the member which engage the boards and at least one wedge surface inclined toward the corner, and said female member having a mortise to receive the tenon whereby to draw the male and female members against the boards to which they are not secured and at the same time draw the boards tightly together.

5. The combination with two boards adapted to be edgewise assembled in angled relation thereby forming a corner, a male member secured to one board in the corner, a female member secured to the other board in the corner, said male member having a projected tenon provided with two faces on planes with the faces of the member which engage the boards and at least one wedge surface inclined toward the corner, said female member having a mortise to receive the tenon whereby to draw the male and female members against the boards to which they are not secured and at the same time draw the boards tightly together, said tenon and mortise being arranged directly in the corner and said mortise being cut into the corner edge of the female member to provide an open mortise.

6. The combination with two boards assembled in two planes in angular relation to one another thereby forming a corner, a male member in the corner secured to one board, and a female member in the corner secured to the other board, said male and female members lying end to end and having double wedge shaped mating parts at the adjacent ends, whereby upon mating the male and female members, the male member will be drawn against the board having the female member and the female member will be drawn against the board having the male member.

Dated at New Orleans, La., this 11th day of September, 1924.

WM. F. PLEMER.